Nov. 18, 1924.

G. GEAKUMIS

BUMPER

Filed May 31, 1924

Witnesses:
W. Schnellbach
J. D. Stuwe

Inventor:
Gust Geakumis
By Joshua R. H. Potts
His Attorney.

Nov. 18, 1924.

G. GEAKUMIS 1,516,273

BUMPER

Filed May 31, 1924  2 Sheets-Sheet 2

Inventor:
Gust Geakumis

Patented Nov. 18, 1924.

1,516,273

UNITED STATES PATENT OFFICE.

GUST GEAKUMIS, OF CHICAGO, ILLINOIS.

BUMPER.

Application filed May 31, 1924. Serial No. 716,856.

*To all whom it may concern:*

Be it known that I, GUST GEAKUMIS, a citizen of the United States, and a resident of the city of Chicago, county of Cook, and State of Illinois, have invented certain new and useful Improvements in Bumpers, of which the following is a specification.

My invention relates to bumpers, and has for its object to provide a bumper mountable on an automobile or similar motor vehicle, and possessing a maximum amount of resiliency in order to effectively cushion all impact of an encountered object or machine; and another object is to provide a spring bumper constructed of connected compound spring means each of which includes a plurality of superposed spring members.

Other objects will appear hereinafter.

The invention consists in the combinations and arrangements of parts hereinafter described and claimed.

The invention will be best understood by reference to the accompanying drawings forming a part of this specification, and in which, Fig. 1 is a plan view of my invention mounted in position at one end of an automobile;

Figure 1:
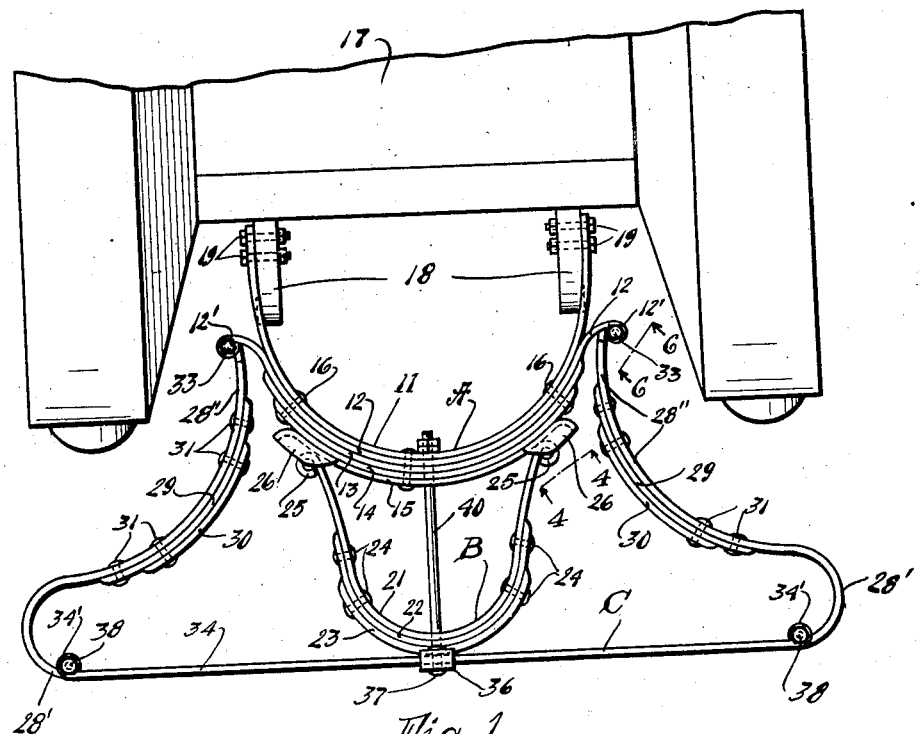

The form of my invention illustrated in the drawings comprises a compound spring mechanism or means "A" built up of a plurality of superposed leaf springs 11, 12, 13, 14 and 15, curved substantially semi-circular in form and secured together as with rivets 16. Said spring means "A" is mounted at the front or at the rear of the automobile 17, wherever desired, preferably by securing the ends of the first or main member 11 to the frame bars 18 of said automobile, as with a plurality of bolts 19.

Yoke shaped spring means "B" are mounted forward of spring means "A" and are formed of a plurality of superposed spring members 21, 22 and 23, secured together with rivets 24 or other suitable fastening means. The inner member 21 has its ends 25 curled or rounded and slidably mounted within dished means or channel means 26 provided at the ends of outer spring member 15 of spring means "A", said curled ends 25 being arranged to move laterally outwardly in said channel means 26 to provide resiliency and inward movement of the intermediate superposed portion of spring means "B".

Figure 2:
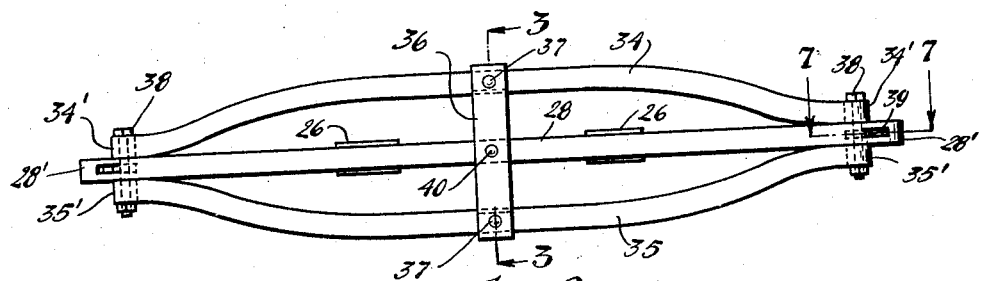
Fig. 2 is a front view of my invention.
Figure 3:
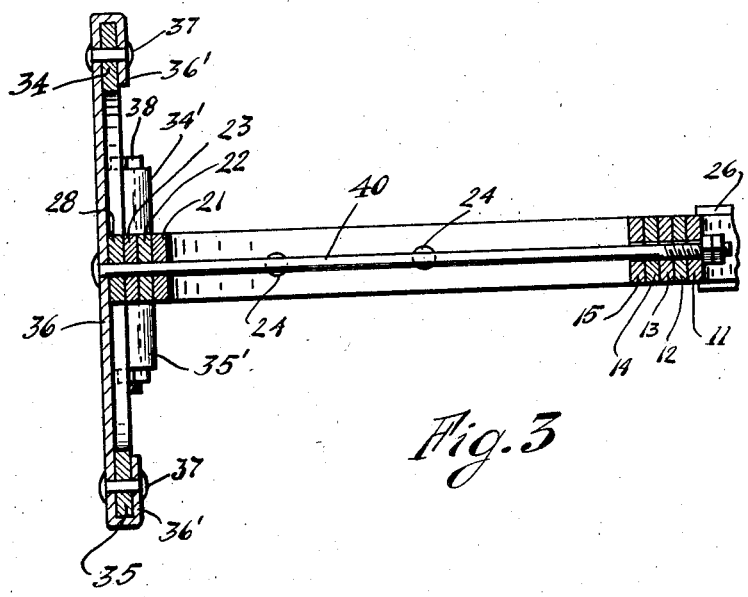
Fig. 3 is an enlarged vertical sectional view taken on line 3—3 of Fig. 2.
Figure 4:
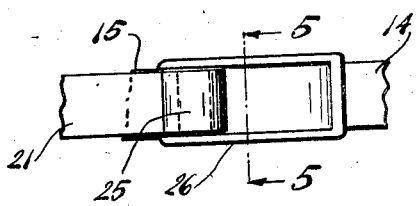
Fig 4 is an enlarged fragmentary view taken in the direction of the arrows on line 4—4 of Fig. 1.
Figure 5:
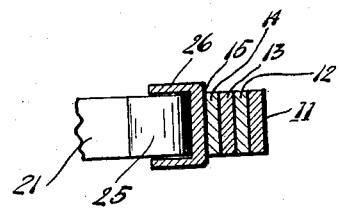
Fig. 5 is a vertical sectional view taken on line 5—5 of Fig. 4.
Figure 6:
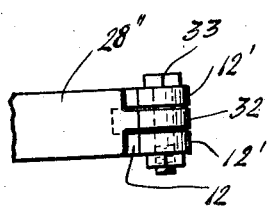
Fig. 6 is an enlarged fragmentary view taken in the direction of the arrows on line 6—6 of Fig. 1.
Figure 7:
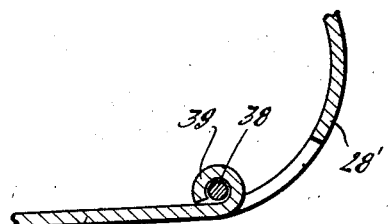
Fig. 7 is an enlarged horizontal sectional view taken on line 7—7 of Fig. 2.

Buffer means or outer spring means "C" is mounted around spring means "A" and "B", and comprises a main spring member or bar 28 having a straight part extending across the front of the automobile, being then curved rearwardly and inwardly at 28′, and then curved outwardly at 28″, curved springs 29 and 30 being superposed and secured on curved portions 28″ by means of rivets or similar fastening members 31, to form a curved compound spring portion adjacent each end of said main spring bar 28. At the ends of portions 28″ are formed curled lips 32 engaging between curled lips 12′ formed at the ends of spring member 12, said curled lips being held together by means of bolts 33. Additional bars 34 and 35 are mounted above and below bar 28 as shown in Fig 2, and are fastened in spaced relation thereto by a plate 36 having its ends 36′ bent around said bars and secured thereto by rivets 37 or the like, as best shown in Fig. 3; while bolts 38 pass through tongues 39 formed on bar 28, and through curled ends 34′ and 35′ on bars 34 and 35, to hold said parts together. A rod or bolt 40 is mounted with a driving fit in plate 36 and bar 28 of spring means "C", and extends loosely or slidably through spring means "A" and "B", to permit inward movement of said bolt 40 when the spring means "C" and "B" are depressed or flexed inwardly toward spring means "A".

The number of springs which are superposed or placed over each other, and the sizes of such springs, will be increased or decreased from that shown in the drawings, to be properly and particularly adapted for the heavier or for the lighter automobiles, trucks, or similar motor vehicles; and in each case my bumpers are so arranged and constructed as to fully and effectively cushion all impact of any encountered object or vehicle, and will thus prevent any shocks to the vehicle to which said bumper is attached as well as to the article or vehicle encountered.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A bumper comprising a plurality of leaf spring members connected by movable joints and mounted one outward of the other to produce a compound cushioning effect, said spring members having compound curved portions.

2. A bumper comprising semi-circular resilient means connected with the rear end of the frame of a vehicle and having a compound forward portion with outcurved ends at the sides thereof, and curved spring means mounted forward of said resilient means and having ends movably connected to said outcurved ends.

3. A bumper comprising semi-circular resilient means having its ends connected to the frame of a vehicle and having a compound curved portion with outcurved ends at the sides thereof, and spring means with curved compound side portions mounted forward of said resilient means and having ends pivotally connected to said outcurved ends.

4. A bumper comprising semi-circular resilient means composed of a plurality of leaf springs and connected to the frame of an automobile, one of said leaf springs being provided with outcurved ends, and curved leaf spring means pivotally connected with the ends in said outcurved ends.

5. A bumper comprising curved resilient means mounted on an automobile and having a compound curved portion with channel means, and spring means having its ends movably mounted in said channel means.

6. A bumper comprising curved resilient means connected by its ends to an automobile and having curved channel means, and curved leaf spring means mounted outward of said resilient means and having its ends slidably mounted in said channel means.

7. A bumper comprising semi-circular resilient means including a plurality of superposed leaf springs mounted on an automobile, one of said leaf springs being provided with channel means, and yoke shaped spring means including a plurality of curved leaf springs provided with curled means slidably mounted in said channel means.

8. A bumper comprising curved resilient means mounted on an automobile and having outcurved means, spring means mounted forward of said resilient means and slidably connected thereto, and spring means mounted forward of said slidable spring means and having ends connected in said outcurved ends.

9. A bumper comprising semi-circular resilient means including a plurality of leaf springs mountable on an automobile and being provided with outcurved ends and with channel means, curved spring means mounted forward of said resilient means and having ends slidably mounted in said channel means, and spring means with bumper bars mounted forward of said curved spring means and provided with curved superposed portions and with ends mounted in said outcurved ends.

10. A bumper comprising a bowed leaf spring connected by its outer ends to the frame of a vehicle, similar leaf springs secured thereto and therewith forming a curved compound portion, the inner one having outcurved ends and the outer one having channeled ends, spring means mounted forward of said compound portion and having a forward portion built up of curved leaf springs and having ends slidably mounted in said channeled ends, spring means with curved compound side portions and ends pivotally connected to said outcurved ends and having bumper bars positioned forward of said leaf springs, and a bolt connected to said bars and slidable centrally through said leaf springs.

In testimony whereof I have signed my name to this specification in the presence of two subscribing witnesses.

GUST GEAKUMIS.

Witnesses:
  GEO. SARANTO POULOS,
  JOHN N. MITCHELL.